United States Patent Office 2,987,409
Patented June 6, 1961

2,987,409
FILM FORMING COMPOSITIONS
Paule Valls, Paris, and Yves Etienne, Vincennes, France, assignors to Eastman Kodak Company, Rochester, N.Y., a corporation of New Jersey
No Drawing. Filed Apr. 29, 1959, Ser. No. 809,616
3 Claims. (Cl. 106—176)

This invention concerns novel cellulose organic acid ester compositions having improved stability and adapted for rapid coating on a polished rotating surface.

Cellulose derivative sheets or films are ordinarily produced by depositing a cellulose derivative solution or dope in the form of a film on the highly polished surface of a slowly-rotating wheel or band, causing the film to set by evaporation of solvent, stripping the film and curing out any residual solvent. The compositions generally employed in the manufacture of films are of such nature that the films attain a solid or semi-solid condition permitting removal of the material from the film forming surface only by gradual evaporation of solvent.

In order to increase the speed of coating cellulose derivatives onto rapidly moving casting wheels, coagulants are added to the cellulose ester dope which cause the material to gel or coagulate permitting the material to be stripped from the film without the necessity of removing all the solvent.

Some of the solvents which have been added to cellulose derivative coatings do not provide satisfactory products because of the formation of by-products in the cellulose ester coating or due to the difficulty in removing residual solvents. Others affect the dimensional stability, curl resistance, flexibility and the like. We have found certain new solvents which can be used for this purpose which not only do not have a detrimental effect on the cellulose film but improve characteristics such as dimensional stability in water and the like.

The advantages of the new coagulants are permitting rapid coating, improving the final products, and obtaining more efficient use of coating equipment. This is particularly important in the case of multiple hopper operations, such as those where two hoppers or more are used on a single coating wheel. In these coating operations it is desirable to have the material gel as soon as possible in order to provide a surface for a succeeding coating. Typical multiple hopper coating operations are described in United States patent application Ser. No. 721,784, filed March 17, 1958.

One object of this invention is to provide a process for rapid coating of cellulose derivative dopes. Another object is to provide coagulants for cellulose derivative dopes which improve the dimensional stability, flexibility and tensile strength of cellulose derivative films. A further object is to provide a coagulant which is compatible with solvents used for cellulose derivatives and which results in rapid coagulation of cellulose derivative coatings on a highly polished casting surface.

The above objects are carried out by incorporating a compound selected from the class consisting of trimethylcyclohexanone, and metadioxane having the following general formula:

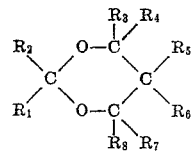

in which the groups $R_1$–$R_8$ are hydrogen atoms or monovalent hydrocarbon groups such that the molecular weight of the metadioxane is from 88 to 230. The groups may be the same or different.

The meta-dioxanes of the above formula can be prepared according to known methods such as by the condensation of a 1–3 diol and an aldehyde or a ketone in the presence of an acidic catalyst.

Preferably, the coagulant constitutes from 5 to 10% by weight of the solvent mixture.

The following illustrates the operation of our invention but is not intended to limit it in any way.

Solutions were prepared from cellulose triacetate having a concentration of 17 g. cellulose triacetate in 100 ccs. of a solvent mixture having the following proportions:

|  | Parts by weight |
|---|---|
| Methylene chloride | 89.5 |
| Methyl alcohol | 5.9 |
| Liquid coagulant | 4.6 |

A series of samples were prepared either containing various coagulants according to the invention or prepared using butanol as the known coagulant without a plasticizer. A series of samples was also prepared containing either one of various coagulants according to our invention or with butanol and with triphenyl phosphate as a plasticizer in an amount of about 15% by weight based on the cellulose acetate. For each series a control sample was prepared without any coagulant.

The samples were obtained by coating on glass at room temperature and dried for 90 minutes at 120° C. after stripping the sample from the support.

The results of the tests obtained from the samples without a plasticizer are contained in Table I, while Table II indicates the results of testing the plasticized samples.

Table I

| Coagulant | Tensile strength in Kg./mm.² | Percent elongation before breaking | Schopper Folds | Albert Twing Tear in grams | Dimensional stability (swell percent) |
|---|---|---|---|---|---|
| Control without butanol | 11.0 | 22 | 21 | 28 | 1.40 |
| Butanol | 12.5 | 25 | 25 | 35 | 1.13 |
| 2,2,4-trimethyl cyclohexanone | 8.4 | 28 | 51 | 44 | 0.52 |
| 2,2,5,5-tetramethyl-1,3-dioxane | 10.5 | 28 | 38 | 48 | 0.66 |
| 2-isopropyl-5,5-dimethyl-1,3-dioxane | 8.7 | 30 | 50 | 37 | 0.66 |
| 2-isopropyl-4,4,6-trimethyl-1,3-dioxane | 7.6 | 28 | 54 | 27 | 0.46 |

Table II

| Coagulant | Tensile strength in Kg./mm.² | Percent elongation before breaking | Schopper Folds | Albert Twing Tear in grams | Dimensional stability (swell percent) |
|---|---|---|---|---|---|
| Control without butanol | 10.5 | 26 | 40 | 32 | 1.0 |
| Butanol | 12.0 | 30 | 50 | 39 | 0.82 |
| 4,4,6-trimethyl-1,3-dioxane | 10.1 | 30 | 40 | 35 | 0.68 |
| 5,5-dimethyl-1,3-dioxane | 9.4 | 29 | 42 | 49 | 0.58 |
| 5,5-diethyl-1,3-dioxane | 9.5 | 42 | 65 | 41 | 0.46 |
| 2-hexyl-4-methyl-1,3-dioxane | 10.0 | 30 | 48 | 37 | 0.50 |

Table III indicates the properties of plasticized films obtained by coating on a small semi-industrial type coating wheel with the speed of coating varied. The films were dried 10 minutes at 100° C. in a preliminary drying step, 30 minutes at 90° C. in a regular drying step and 90 minutes at 120° C. in an oven.

Table III

| Coagulant | Tensile strength in Kg./mm.² | Percent elongation before breaking | Albert Twing Tear in grams | Dimensional stability (swell percent) |
|---|---|---|---|---|
| Butanol | 9.8 | 43 | 58 | 0.66 |
| 2-isopropyl-4,4,6-trimethyl-1,3-dioxane | 8.1 | 50 | 47 | 0.56 |
| 2-isopropyl-5,5-dimethyl-1,3-dioxane | 8.1 | 47 | 51 | 0.52 |
| 2,2,4-trimethyl-cyclohexanone | 7.1 | 46 | 54 | 0.44 |

The size of the sample which was used to determine the various tests was $$15 \times 100 \times \frac{14 \pm 1}{100} \text{ mm.}$$

in all cases.

The Schopper fold test is the standard A.S.T. test designated D643–43, method A, the Schopper folding endurance test.

The Albert Twing test is the force in grams necessary to tear a piece of film 70 x 150 mm., 55 mils. in thickness after nicking the film.

The dimensional stability to water is a determination widthwise. Two perforations actually 10 inches apart are made in each sample and measurements from outside edge to outside edge of the perforation holes are taken using a gauge graduated in thousandths of an inch. The samples are conditioned at 50% relative humidity for 2 hours, placed in a water bath at 100° F. and left for 17 hours. They are then dried at 50% relative humidity and 68° F. for 48 hours and measured; and then placed in a water bath at 68° F. for 17 hours and measured again. The differences betwen the two measurements is used to give the swell per cent widthwise.

From the above data it can be seen that there is an improvement in the dimensional stability to water of the films prepared with the new coagulating agents of 15 to 25% as compared to the films coated in identical conditions with butanol.

Various coating methods may be used which are within the skill of the art such as hopper coatings, knife coatings, and the like, since the improvement is due to the incorporation of the coagulating agents and not to the type of coating used. Although the coagulation is shown above with cellulose triacetate having about 42.5–44% acetyl content, these coagulants can also be used with other cellulose derivatives, such as cellulose acetate, cellulose acetate propionate, cellulose acetate butyrate, and the like.

The proportions of methylene chloride and of methanol in the solvent mixture given above can be varied between 65 and 90% for methylene chloride and 25 to 5% for a lower alcohol such as a methanol.

The coagulants according to our invention such as the metadioxanes can be advantageously utilized alone or mixed with lower alcohols such as methanol and ethanol, as constituents of coagulation baths for the process of fabricating films by coating in a coagulation bath.

We claim:
1. A process for obtaining cellulose triacetate film comprising preparing a film-forming composition with cellulose triacetate and an organic solvent mixture of 65–95% by weight methylene chloride and 25–5% lower alcohol and containing 10% by weight of the solvent mixture of a coagulating agent selected from the class consisting of trimethylcyclohexanone and metadioxane having the following formula:

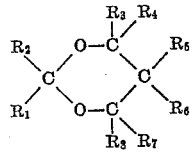

in which $R_1$–$R_8$ are selected from the class consisting of H and saturated hydrocarbon radicals such that the molecular weight of the metadioxane is within the range of 116–230 and coating the film-forming composition on a highly polished coating surface to form a film, removing the film from the casting surface and drying.

2. A film-forming composition for casting films having improved dimensional stability obtained by coating on a highly polished casting surface, consisting essentially of cellulose triacetate having an acetyl content of 42.5–44% and an organic solvent mixture of 65–95% by weight methylene chloride and 25–5% lower alcohol and containing 5–10% by weight of the solvent mixture of a coagulating agent selected from the class consisting of trimethylcyclohexanone and metadioxane having the following formula:

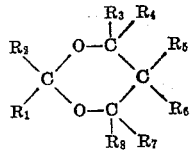

in which $R_1$–$R_8$ are selected from the class consisting of H and saturated hydrocarbon radicals such that the molecular weight of the metadioxane is within the range of 116–230.

3. A film-forming composition for obtaining films having improved dimensional stability by coating on a highly polished casting surface, consisting essentially of cellulose triacetate having an acetyl content of 42.5–44% and an organic solvent mixture of 65–95% by weight methylene chloride and 25–5% lower alcohol and containing 5–10% by weight of the solvent mixture of 2-isopropyl-5, 5-dimethyl-1, 3-dioxane.

References Cited in the file of this patent
UNITED STATES PATENTS

| | | |
|---|---|---|
| 2,041,692 | Blake et al. | May 26, 1936 |
| 2,045,843 | Dreyfus | June 30, 1936 |
| 2,362,307 | Ritter | Nov. 7, 1944 |